March 20, 1951 C. H. MAIER 2,545,481
NESTABLE FUEL TANK
Filed July 24, 1946 2 Sheets-Sheet 1
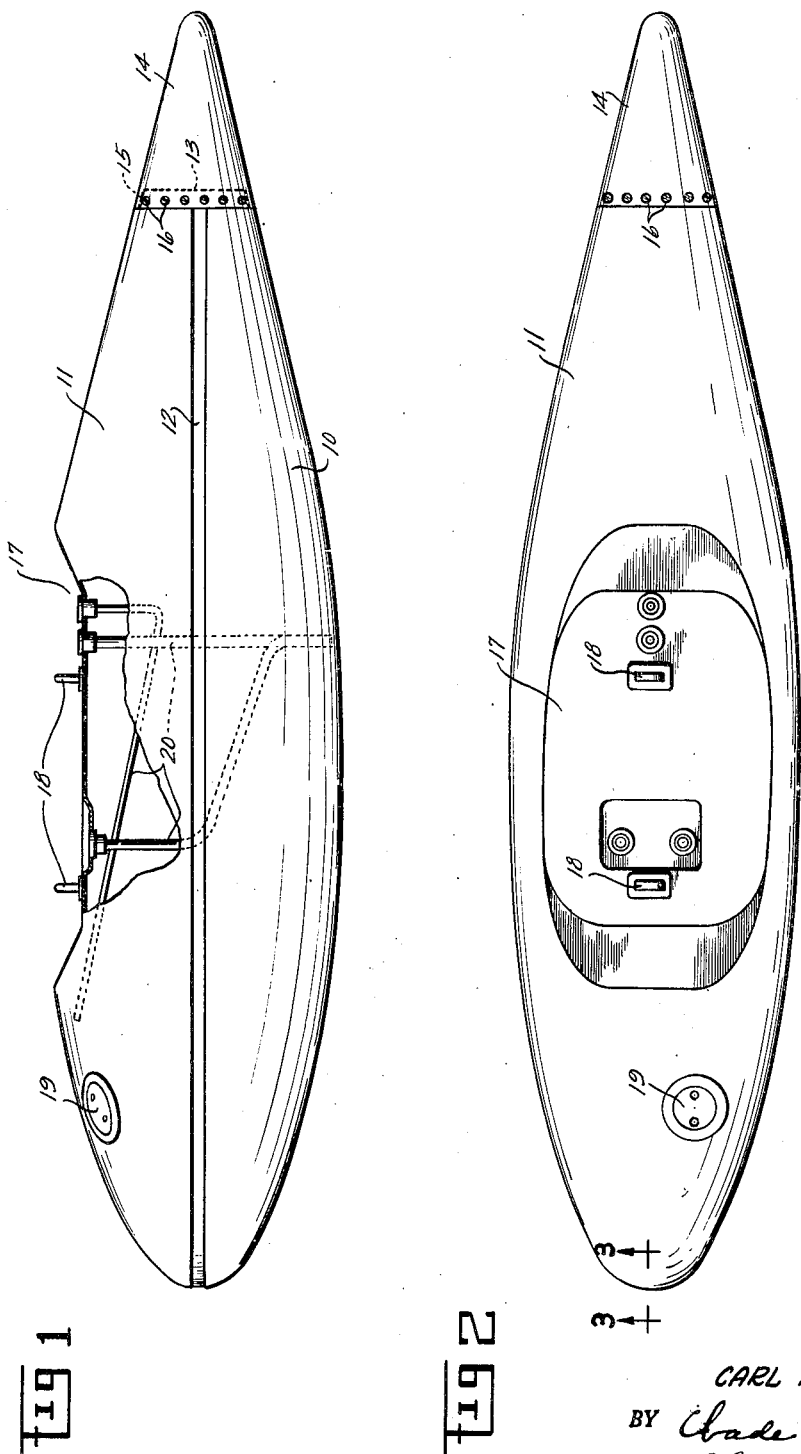
INVENTOR.
CARL H. MAIER
BY
HIS ATTORNEYS March 20, 1951 — C. H. MAIER — 2,545,481
NESTABLE FUEL TANK
Filed July 24, 1946 — 2 Sheets-Sheet 2
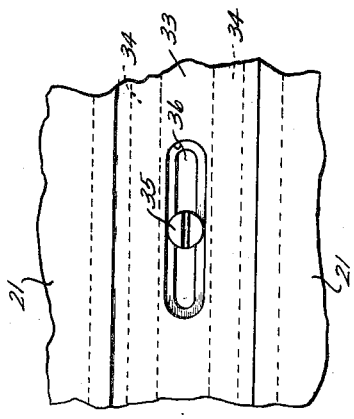
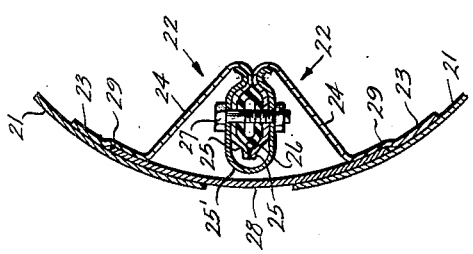
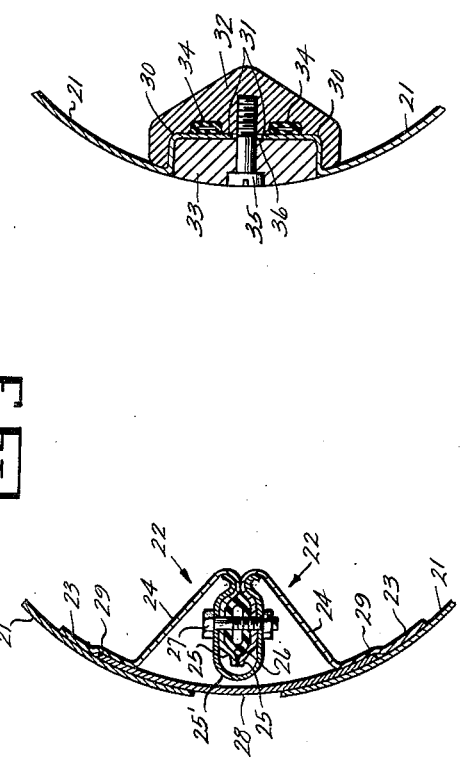
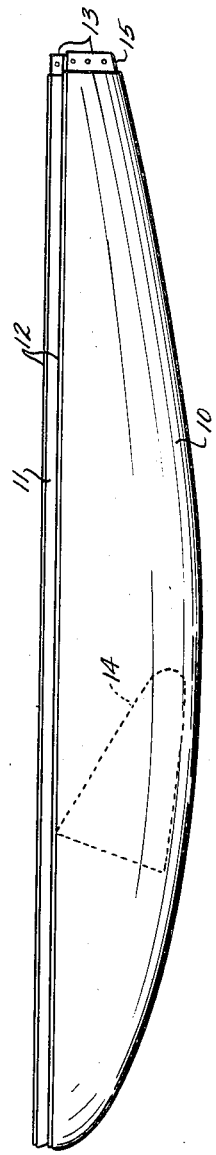
INVENTOR.
CARL H. MAIER
HIS ATTORNEYS Patented Mar. 20, 1951

2,545,481

UNITED STATES PATENT OFFICE 2,545,481

NESTABLE FUEL TANK

Carl H. Maier, Brighton, N. Y.

Application July 24, 1946, Serial No. 685,883

5 Claims. (Cl. 220—5)

(Granted under the act of March 3, 1883, as amended April 30, 1928; 370 O. G. 757)

The invention described herein may be manufactured and used by or for the Government for governmental purposes without payment to me of any royalty thereon.

This invention relates to a nestable fuel tank particularly useful for aircraft or the like.

In the past, nestable tanks for aircraft have been known, but their outer surfaces have been characterized by projecting flanges, bolts, rivets and the like so that a great deal of aerodynamic drag was inherent in their construction. It is an object of this invention to provide a nestable tank of the jettison or droppable variety which when assembled is free from projections into the air stream. Such a tank is especially adapted to the requirements of jet-propelled aircraft.

Another object is the provision of a leakproof joint for the nestable sections, said joint being completely concealable by a fairing, and employing a round gasket instead of the unsatisfactory flat or sheet type.

Referring now to the drawings:

Fig. 1 is a longitudinal section.

Fig. 2 is a plan view.

Fig. 3 is a section taken on the line 3—3 of Fig. 2, showing the leakproof joint.

Fig. 4 is a section corresponding to Fig. 3, but showing a modified joint.

Fig. 5 is a front view of Fig. 4.

Fig. 6 is a side elevation of the nested sections.

In the drawings, 10 is a metallic lower section of the tank and 11 is an upper metallic section. 12 is a joint by which the two sections are held together. It will be observed that the resulting assembly is torpedo-shaped. Sections 11 and 12 are sharply terminated at the stern 13, but a streamlined stern is achieved by the attachment to the stern of a fairing cap or cone 14. Any suitable method of attaching the cone may be employed as, for example, to form a slight shoulder 15, no deeper than the thickness of the metal from which the cone is made, into the aft ends of the tank sections 10 and 11. Flush screws 16 and gaskets (not shown) may then be used to attach the cone to the shoulder.

In upper section 11, there is a depression 17 having a conformation to fit that part of the aircraft to which it is to be attached. For actual attachment, a pair of eyed hangers 18 is provided which may be welded to the metallic skin of the upper section and arise from the depression 17.

A filler cap 19 is provided for easy access in the top front of section 11. A system 20 of fuel delivery, vent and dump pipes is provided within the tank and making exit to the depressed area 17 but since this system forms no part of the present invention, it is not described in detail.

Referring now to Fig. 3, 21 is the outer metallic skin of the tank and 22 are each clip strips spot welded to the skin 21. Each clip strip 22 has an attaching portion 23, which is to be spot welded, an angled shank portion 24 and a trough-shaped portion 25, each of which substantially joins a similar portion on a like clip strip. A joint is therefore made by the abutment of clip strips 22. It has a triangular outer shape, the abutment of troughs 25 lying within the outer triangle. Laid within the troughed portion 25 is a tubular gasket 26 of soft material such as oilproof rubber or "Vinylite." Over the joint so made, a continuous or discontinuous spring clip 25' is attached. This clip has a generally oval shape and its function is to confer added strength and to smooth the outer surface of the joint. It is to be understood that the joint extends completely around the tank with the exception of the tail cone. Upper and lower clip strips 22 are held together with the gasket 26 in compression by means of bolts 27 which extend through holes in the clip strip 22, spring clip 25' and gasket 26 at intervals around the joint. The spring clip 25' may be omitted.

In order to preserve the basic contour of the tank, the skin 21 is allowed to extend past the attaching portions 23 so that a narrow slot remains to be closed around the tank. For this purpose, a fairing strip 28 of flexible metallic or nonmetallic material is extended around the tank under the projecting skins. For the accommodation of such strip 28, there is a slight shoulder 29 formed in each attaching portion 23 which is just deep enough to make a slot in each portion 23 between it and the skin 21 as wide as the thickness of the strip 28. In manufacture of the tank, the two sections 10 and 11 are bolted together with the gasket in place. They contain a rolled coil of fairing strip which has been started into its position in the slot between attaching portions 23 and the skin 21 from the rear end of the tank. It may then be pulled around the entire circumference of the tank with pliers or other suitable tools. It effectively preserves the streamlined shape of the tank.

Referring now to Figs. 4 and 5, a modified joint is shown. The skin 21 extending from both upper and lower shells is formed into a shoulder 30, thereby forming a groove 31 around the tank. The groove is made liquid tight by the coaction of an internal channel member 32 which is also grooved to fit over the shoulders 30 of the internally-projecting groove 31. An external filler strip 33 is laid in the groove over two tubular gaskets 34 of oilproof rubber or Vinylite which are received in the inner channel member 32. Screws 35 are provided at suitable intervals piercing the filler strip 33 and extending into the internal channel member 32. A longitudinal slot 36 is provided in the filler strip 33 so that the screw 35 may be located between the projecting edges of the skin 21 and so need not pierce it.

In Fig. 6 it is shown that the top section 11 can be reversed and nested into bottom section 10 and that the tail cone 14 will fit into section 11. A compact knockdown assembly is therefore provided for shipping.

The invention claimed is:

1. In a fuel tank, a plurality of nestable shells of streamlined shape, a strip clip strongly attached to each of said shells adjacent the internal edge thereof, said clips being combinable to form a triangular channel and their inner edges combinable to form a tube-like channel within the triangular channel, a tubular soft gasket within the channel formed by the inner edges, fastening means holding said clip strips together in the region of said channel, said clip strip assembly being located entirely within the edges of said shells, and a fairing strip disposed longitudinally of the shells in a position to seal a slot that would otherwise be present between the shells, said fairing strip being substantially at the position of the material forming the skin of the shells.

2. A fuel tank according to claim 1 having in addition a spring clip enclosing the tube-like channel and the gasket contained therein, the fastening means extending also through said spring clip.

3. In a fuel tank, a plurality of nestable shells of streamline shape, a clip strip strongly attached to the inner edge of each shell, said clip strip having an inwardly extending shank, an outwardly bent portion and a longitudinally grooved portion, whereby two opposed clip strips will form a tube-like channel extending around said shells within their edges, said strips being of such dimensions that the shell edges are prevented from meeting, thereby forming a longitudinal slot, a fairing means disposed within said shells at the locality of said slot to close same whereby to continue the basic contour of said shells, and means within said shells for supporting said fairing strip.

4. A tank according to claim 3 in which the means for supporting the fairing strip is a slot formed between the internal side of the shell skin and a shouldered portion of that portion of said clip strips by which the latter are attached to said shell skin.

5. A knock down aircraft fuel tank of ovoid streamline shape divided longitudinally into two nestable complementary half shells, each half shell having a sheet metal continuous internal shoulder formed therein adjacent the marginal edge of the shell, a trough shaped portion adjacent said internal shoulder and formed by bending a portion of the sheet forming the internal shoulder outwardly, a continuous clamping member or clip engageable with the joined shoulders of each half shell to retain the half shells in assembled relation, said clip being carried within joined internal shoulders, a continuous soft non-metallic resilient sealing gasket disposed between the edges of the said half shells within the meeting trough shaped portions thereof and bolt means extending through said clamping member and gasket for applying pressure to the sealing gasket and for retaining the clamping member or clip in position.

CARL H. MAIER.

REFERENCES CITED

The following references are of record in the file of this patent:

UNITED STATES PATENTS

| Number | Name | Date |
|---|---|---|
| 1,029,745 | Eaton | June 18, 1912 |
| 1,263,403 | Gorton | Apr. 23, 1918 |
| 1,604,855 | Skitt | Oct. 26, 1926 |
| 1,740,237 | Greenwood et al. | Dec. 17, 1929 |
| 1,894,675 | Dixon | Jan. 17, 1933 |
| 2,300,259 | Kueppers | Oct. 27, 1942 |
| 2,402,253 | Macleod | June 18, 1946 |